A. L. CLARK.
TRUCK.
APPLICATION FILED JAN. 30, 1907.

921,798.

Patented May 18, 1909.
2 SHEETS—SHEET 1.

Witnesses
R. M. Sullivan.
C. D. Scott

Inventor
Alfred L. Clark

By
M. M. Cady
Attorney

A. L. CLARK.
TRUCK.
APPLICATION FILED JAN. 30, 1907.

921,798.

Patented May 18, 1909.
2 SHEETS—SHEET 2.

Witnesses
R. M. Sullivan
C. L. Scott

Inventor
Alfred L. Clark

By
M. M. Cady
Attorney

UNITED STATES PATENT OFFICE.

ALFRED L. CLARK, OF DUBUQUE, IOWA.

TRUCK.

No. 921,798.     Specification of Letters Patent.     Patented May 18, 1909.

Application filed January 30, 1907. Serial No. 354,906.

*To all whom it may concern:*

Be it known that I, ALFRED L. CLARK, a citizen of the United States, residing at Dubuque, in the county of Dubuque and State of Iowa, have invented certain new and useful Improvements in Trucks, of which the following is a specification.

My invention relates to car-trucks with special reference to those used on rail-ways, and has for its object to provide a truck which shall transfer the load from the axle to the outside rim of the wheel and reduce to a minimum the friction on the axle. Also to provide means whereby the car will travel over the track smoothly without the attendant pounding and jarring, further to increase the contact of the wheels with the track at the same time to prevent the wheels from leaving the track and also to avoid the use of springs and still give the car an easy movement along the track, and generally to improve the rail-way truck and bed whereby, it will be adapted for better service under all circumstances.

It consists essentially in a plurality of wheels, linked together and adapted to travel around within a bed, with means connected with the bed for guiding and controlling the travel of the wheels.

It also consists in providing means, whereby, when the wheels are traveling on the track they will be entirely inclosed within the bed excepting a small part of the wheels that are traveling upon the track.

It also consists in details of construction and assembling of the members which will be fully described and shown in the following specification.

Figure 1:
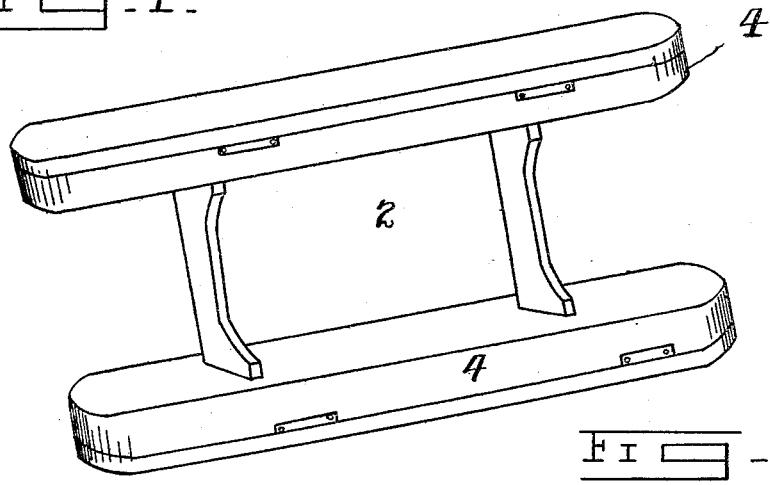
Figure 2:
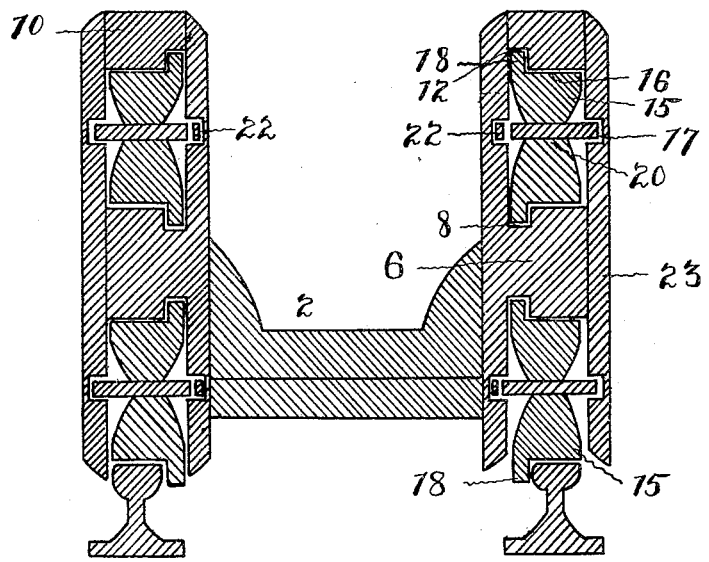
Figure 3:
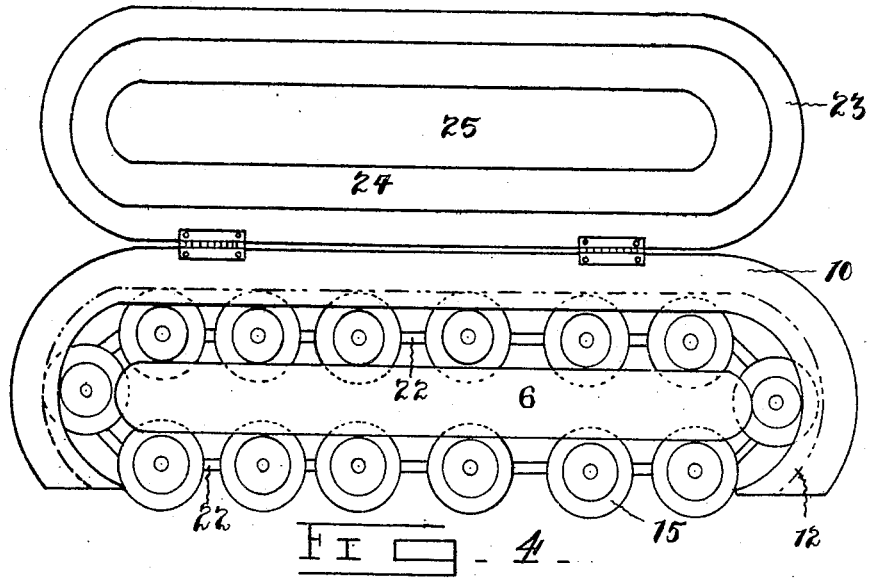
Figure 4:
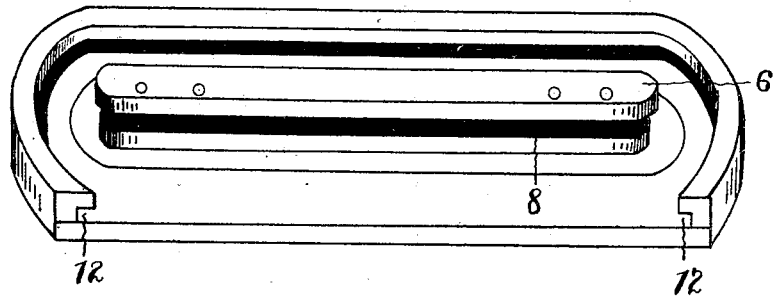

Figure 1 is a perspective view of the truck. Fig. 2 is a cross section through line $x$—$x$ of Fig. 1. Fig. 3 shows a side elevation of the wheel-bed with the wheels uncovered. Fig. 4 is a perspective view of the wheel-bed uncovered and the wheels removed.

Like characters of reference denote corresponding parts in each of the figures.

Referring to the drawings, 2 designates the truck and 4 the wheel-beds, in which the wheels, hereinafter to be described, travel. Within each side of the bed is secured a central-plate 6 cut away on each inner edge at 8 in which the flanges of the wheels travel, and which serves as guides to the wheels. This plate may be cast integral with the wheel-bed or in a separate piece rigidly secured to the wheel-bed. Against the outer rim of the wheel-bed 4 is secured a plate 10, forming with the bed a groove 12 in which also the flanges of the wheels travel, but this plate may be formed integral with the wheel-bed.

The wheels proper are composed of a plurality of small wheels 15 and each of the smaller wheels is composed of a tread 16, hub 20 and the flange 18. Through each wheel is an opening for an axle 17, to which the wheels are pivoted together by links 22 forming an endless chain of wheels and the links and the wheels together forming one flexible wheel. Part of the wheels 15 are caused to travel around plate 6 in the wheel-bed with their flanges in the grooves 8 and 12 while its remaining wheels are traveling along the track and projecting a trifle below the wheel-bed. With all of these guides for the wheels it will be observed that the wheels would be prevented from leaving the track unless the whole truck is derailed.

To the plate 10 is secured, preferably hinged, a cover or door 23 which serves the purpose both for a covering and guide for the wheels. It consists of a plate of the size of the wheel-bed and has a groove or recess 24 extending around the outer edge and leaving a central piece 25 in which recesses the hubs 20 or ends of the wheels travel. This cover 23 is rigidly bolted to the wheel-bed and becomes part of each wheel-bed and since it is grooved and the grooves correspond with the recesses in the wheel-bed, it forms a cover for the recesses in which the wheels travel around and in the bed and a cover for the wheels. The wheel-bed may be made in one piece and recessed out where the wheels travel, but I prefer to make them in two pieces and rigidly bolt them together.

By this mode of construction, the wheels are set to travel in a given path and are prevented from varying their line of travel, and hence there is no tendency for the wheels to leave the track. Further the flanges of the wheels are in engagement with the groove in the peripheral member except while they are on the track and are always in engagement with the groove that surrounds the bed.

Having now described my invention what I claim is:

1. In a device of the character described, a truck bed comprising a centrally disposed member, and a surrounding peripheral member, of a plurality of wheels traveling in grooves and a peripheral rail-engaging flange carried by each of said wheels, there being a peripheral groove formed in both the centrally disposed member and the surrounding peripheral member of the truck bed, in which the flanges only of said wheels travel.

2. In a device of the character described, a truck bed comprising side members, a centrally disposed member, and a surrounding peripheral member, of a plurality of wheels traveling in grooves, formed in the side members and a peripheral rail-engaging flange carried by each of said wheels, links connecting the wheels and holding them a given distance apart, and there being a peripheral groove formed in both the centrally disposed member and the surrounding peripheral member of the truck bed, in which the flanges only of said wheels travel.

3. In a device of the character described, a truck bed comprising side members and an interposed peripheral member, one of said side members being hinged to said peripheral member, and a plurality of wheels mounted to travel between the side members.

4. In a device of the character described, a truck bed comprising a centrally disposed member provided with a groove around the same, a surrounding peripheral member provided with a groove, a plurality of wheels, a peripheral rail-engaging flange carried by each wheel said flanges always in engagement with the groove in the centrally disposed member and in engagement with the groove in the surrounding peripheral member except while the wheels are upon the track.

In testimony whereof I have signed my name to this specification in the presence of two subscribing witnesses.

ALFRED L. CLARK.

Witnesses:
M. M. CADY,
G. E. RICKARD.